United States Patent
Drumm

(10) Patent No.: US 9,791,977 B2
(45) Date of Patent: Oct. 17, 2017

(54) TRANSIENT DEFORMATION DETECTION FOR A TOUCH-SENSITIVE SURFACE

(71) Applicant: Rapt IP Limited, Mriehel (MT)

(72) Inventor: Owen Drumm, Dublin (IE)

(73) Assignee: Rapt IP Limited, Mriehel (MT)

( * ) Notice: Subject to any disclaimer, the term of this patent is extended or adjusted under 35 U.S.C. 154(b) by 0 days.

(21) Appl. No.: 14/971,936

(22) Filed: Dec. 16, 2015

(65) Prior Publication Data

US 2016/0170563 A1    Jun. 16, 2016

Related U.S. Application Data

(60) Provisional application No. 62/092,725, filed on Dec. 16, 2014.

(51) Int. Cl.
G06F 3/042 (2006.01)

(52) U.S. Cl.
CPC .. G06F 3/0421 (2013.01); *G06F 2203/04104* (2013.01); *G06F 2203/04109* (2013.01)

(58) Field of Classification Search
CPC .. G06F 3/0317; G06F 3/03545; G06F 3/0412; G06F 3/042; G06F 3/0421; G06F 2203/04104; G06F 2203/04109
See application file for complete search history.

(56) References Cited

U.S. PATENT DOCUMENTS

| | | | | |
|---|---|---|---|---|
| 8,350,831 B2 * | 1/2013 | Drumm | ............... | G06F 3/0421 345/173 |
| 8,531,435 B2 * | 9/2013 | Drumm | ............... | G06F 3/042 345/156 |
| 8,723,839 B2 * | 5/2014 | Drumm | ............... | G06F 3/0421 178/18.09 |
| 9,092,091 B2 | 7/2015 | Piot et al. | | |
| 9,092,092 B2 | 7/2015 | Drumm | | |
| 2002/0075243 A1 * | 6/2002 | Newton | ............... | G06F 3/0421 345/173 |
| 2002/0118162 A1 | 8/2002 | Sheridon et al. | | |
| 2004/0263482 A1 * | 12/2004 | Goertz | ............... | G06F 3/042 345/173 |
| 2005/0243070 A1 | 11/2005 | Ung et al. | | |
| 2006/0028457 A1 | 2/2006 | Burns | | |
| 2006/0114237 A1 * | 6/2006 | Crockett | ............... | G06F 3/0421 345/173 |
| 2006/0227120 A1 * | 10/2006 | Eikman | ............... | G06F 3/0425 345/175 |

(Continued)

FOREIGN PATENT DOCUMENTS

CN      100538800 C     9/2009
EP      2 662 756 A1    11/2013

(Continued)

OTHER PUBLICATIONS

PCT Invitation to Pay Additional Fees, PCT Application No. PCT/IB2015/001995, dated Feb. 12, 2016, 10 pages.

(Continued)

*Primary Examiner* — Joe H Cheng
(74) *Attorney, Agent, or Firm* — Fenwick & West LLP

(57) ABSTRACT

An optical touch-sensitive device detects touch events caused by objects (e.g., pens, styluses, fingers) and determines a touch type for the touch event based on analyzing a deformation wave caused by the touch event.

23 Claims, 12 Drawing Sheets

(56) References Cited

U.S. PATENT DOCUMENTS

| | | | |
|---|---|---|---|
| 2007/0052693 A1* | 3/2007 | Watari | G06F 3/0421 345/175 |
| 2008/0088603 A1* | 4/2008 | Eliasson | G06F 3/0312 345/176 |
| 2008/0192015 A1* | 8/2008 | Lieberman | G06F 3/0421 345/173 |
| 2010/0207910 A1 | 8/2010 | Liu et al. | |
| 2012/0169672 A1* | 7/2012 | Christiansson | G06F 3/0421 345/175 |
| 2012/0212457 A1* | 8/2012 | Drumm | G06F 3/0416 345/175 |
| 2012/0218229 A1* | 8/2012 | Drumm | G06F 3/0421 345/175 |
| 2013/0021300 A1* | 1/2013 | Wassvik | G06F 3/0421 345/175 |
| 2013/0044073 A1* | 2/2013 | Christiansson | G06F 3/0421 345/173 |
| 2013/0100022 A1 | 4/2013 | Thompson et al. | |
| 2013/0162877 A1* | 6/2013 | Wang | G06F 3/0416 348/333.01 |
| 2014/0028629 A1* | 1/2014 | Drumm | G06F 3/0308 345/175 |
| 2014/0340362 A1 | 11/2014 | Spears | |
| 2016/0062549 A1 | 3/2016 | Drumm et al. | |
| 2016/0062550 A1* | 3/2016 | Drumm | G06F 3/0421 345/175 |
| 2016/0098152 A1 | 4/2016 | Drumm et al. | |

FOREIGN PATENT DOCUMENTS

| | | |
|---|---|---|
| EP | 2 703 966 A1 | 3/2014 |
| JP | 2003-35752 A | 2/2003 |
| KR | 2010-0136578 A | 12/2010 |
| TW | 200511086 A | 3/2005 |
| WO | WO 2009/109014 A1 | 9/2009 |

OTHER PUBLICATIONS

PCT International Search Report and Written Opinion, PCT Application No. PCT/IB2015/001995, dated Apr. 22, 2016, 33 pages.

Taiwan Office Action, Taiwan Application No. 104129071, dated May 11, 2016, 6 pages.

United States Office Action, U.S. Appl. No. 14/842,714, dated Oct. 28, 2016, 10 pages.

United States Office Action, U.S. Appl. No. 14/971,913, dated Nov. 4, 2016, 7 pages.

U.S. Appl. No. 62/044,875, "Pen Detection with an Optical Touch Sensitive Device," filed Sep. 2, 2014.

U.S. Appl. No. 62/092,725, "Transient Detection Using a Waveguide and Optical Touch Detection," filed Dec. 16, 2014.

\* cited by examiner

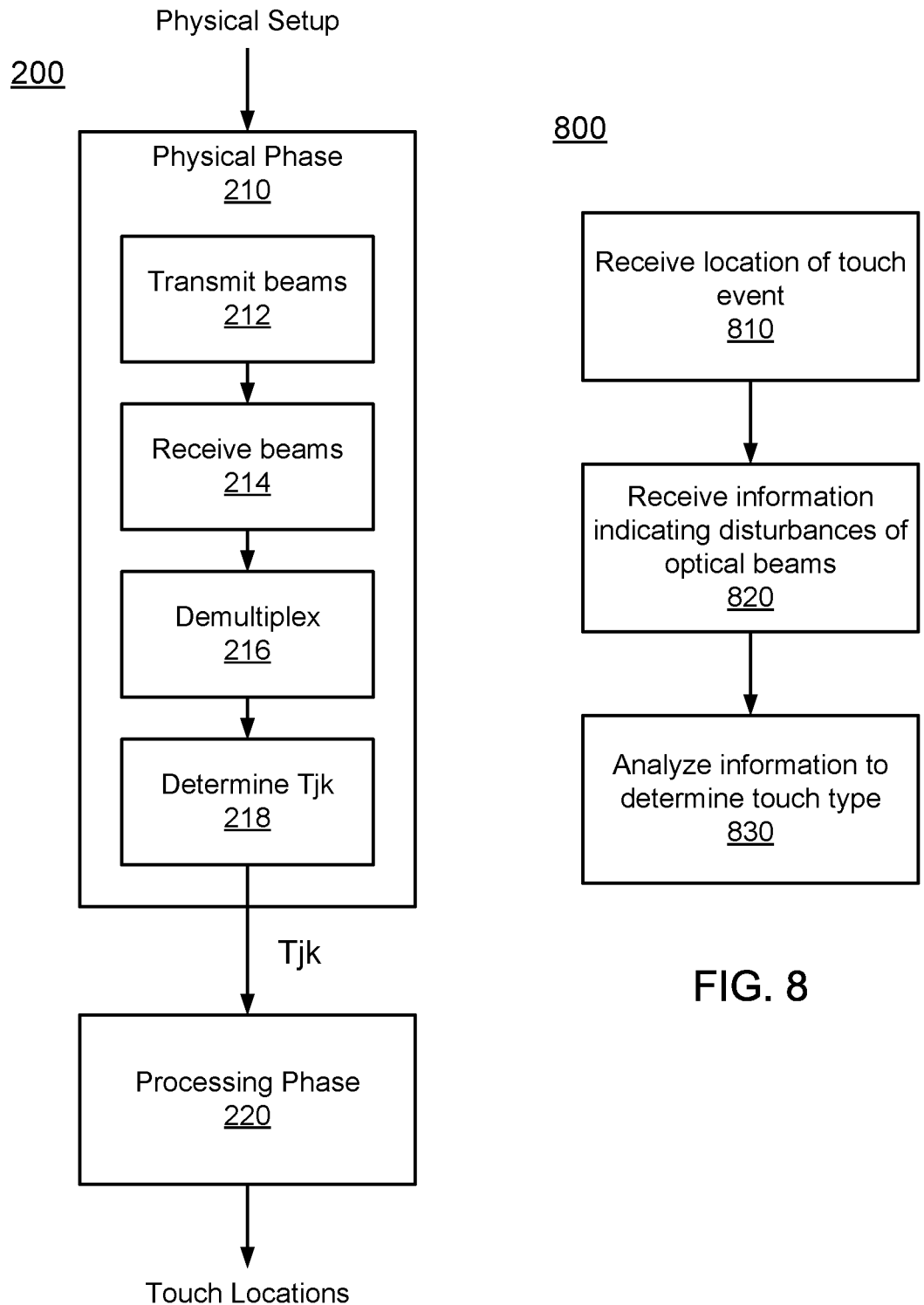

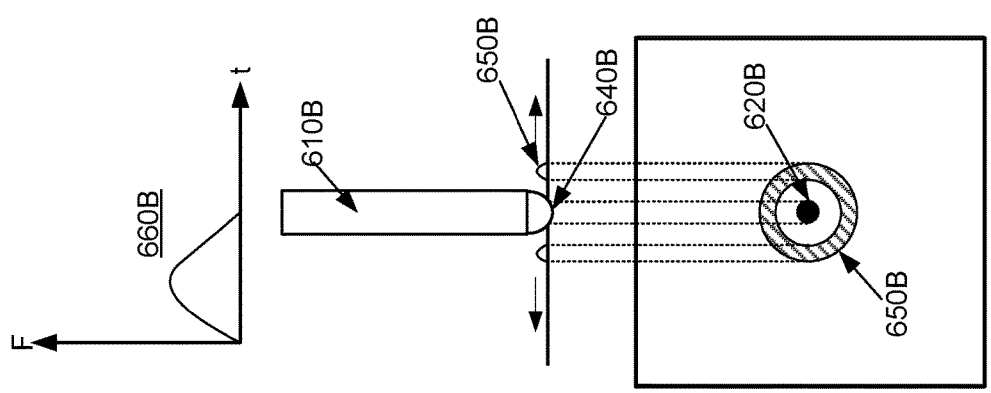
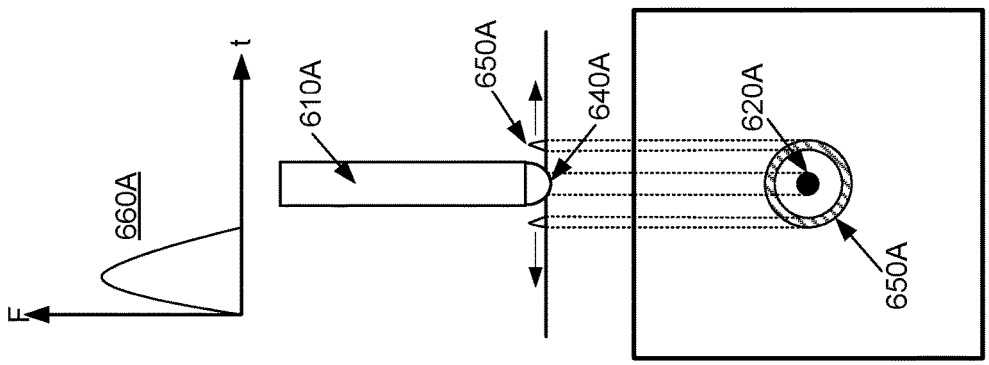

TRANSIENT DEFORMATION DETECTION FOR A TOUCH-SENSITIVE SURFACE

CROSS-REFERENCE TO RELATED APPLICATION(S)

This application claims priority under 35 U.S.C. §119(e) to U.S. Provisional Patent Application Ser. No. 62/092,725, "Transient Detection Using a Waveguide and Optical Touch Detection," filed Dec. 16, 2014. The subject matter of all of the foregoing is incorporated herein by reference in its entirety.

BACKGROUND

1. Field of Art

This invention generally relates to optical touch detection systems.

2. Description of the Related Art

Touch-sensitive displays for interacting with computing devices are becoming more common. A number of different technologies exist for implementing touch-sensitive displays and other touch-sensitive devices. Examples of these techniques include, for example, resistive touch screens, surface acoustic wave touch screens, capacitive touch screens and certain types of optical touch screens.

However, many of these approaches currently suffer from drawbacks. For example, some technologies may function well for small sized displays, as used in many modern mobile phones, but do not scale well to larger screen sizes as in displays used with laptop or even desktop computers. For technologies that require a specially processed surface or the use of special elements in the surface, increasing the screen size by a linear factor of N means that the special processing must be scaled to handle the $N^2$ larger area of the screen or that $N^2$ times as many special elements are required. This can result in unacceptably low yields or prohibitively high costs.

Another drawback for some technologies is their inability or difficulty in handling multitouch events. A multitouch event occurs when multiple touch events occur simultaneously. This can introduce ambiguities in the raw detected signals, which then must be resolved. Importantly, the ambiguities must be resolved in a speedy and computationally efficient manner. If too slow, then the technology will not be able to deliver the touch sampling rate required by the system. If too computationally intensive, then this will drive up the cost and power consumption of the technology.

Another drawback is that technologies may not be able to meet increasing resolution demands. Assume that the touch-sensitive surface is rectangular with length and width dimensions L×W. Further assume that an application requires that touch points be located with an accuracy of $\delta l$ and $\delta w$, respectively. The effective required resolution is then $R=(L W)/(\delta l \ \delta w)$. We will express R as the effective number of touch points. As technology progresses, the numerator in R generally will increase and the denominator generally will decrease, thus leading to an overall increasing trend for the required touch resolution R.

Thus, there is a need for improved touch-sensitive systems.

SUMMARY

An optical touch-sensitive device detects touch events caused by objects (e.g., pens, styluses, fingers) and determines a touch type for the touch event based on analyzing a deformation wave caused by the touch event.

In one aspect, the optical touch-sensitive device includes multiple emitters and detectors. Each emitter produces optical beams which are received by the detectors. The optical beams preferably are multiplexed in a manner so that many optical beams can be received by a detector simultaneously. Touch events disturb the optical beams, for example due to frustrated total internal reflection. Landing of the object on the touch-sensitive surface creates a deformation wave that propagates along the surface. Information indicating which optical beams have been disturbed is analyzed to detect a touch type for the touch event based on the location of the touch event and on propagation of the deformation wave along the touch-sensitive surface.

Different touch types can cause different deformation waves. For example, deformation waves may differ in wave type (transverse, longitudinal), amplitude, width, temporal shape, wavefront or lateral shape, rate of attenuation, frequency content or frequency dispersion, and/or propagation speed. These differences in deformation wave may be caused by underlying differences in the contacting object (e.g. material properties, shape, size, design), properties of the touch-sensitive surface (e.g., material properties, construction), and parameters for the touch interaction (e.g., contact force, speed of contact). Therefore, differences in deformation wave can be used to determine the underlying differences, for example to determine whether a touch is by a hard stylus or by a softer finger.

In another aspect, analysis of the deformation wave is based on optical beams being disturbed by the deformation wave, including temporal effects as it propagates along the touch-sensitive surface. Multiple optical beams may be disturbed over time. Most if not all of these disturbances will occur after landing of the object and outside the contact area for the object. In one approach, disturbances from multiple beams may be combined to produce a better signal to noise ratio, for example by binning optical beams according to zones for the deformation wave.

Other aspects include components, devices, systems, improvements, methods, processes, applications, computer readable mediums, and other technologies related to any of the above.

BRIEF DESCRIPTION OF DRAWINGS

Embodiments of the present invention will now be described, by way of example, with reference to the accompanying drawings, in which:

FIG. 2 is a flow diagram for determining the locations of touch events, according to one embodiment.

FIGS. 6-7 depict different deformation waves generated by different objects.

FIG. 8 is a flow diagram of a method for determining touch type, in accordance with an embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

This detailed description is divided into two parts. Part A provides a description of various aspects of touch-sensitive systems and the detection of multitouch events. These are described primarily in the context of finger touches, but the concepts apply also to instrument (e.g., pen or stylus) touches. Part B provides a description of detecting touch events and touch types, based in part on a deformation wave caused by the touch. The following is the contents of the detailed description:

Part A: Touch Detection
  I. Introduction
  II. Physical Set-up
  III. Processing Phase
Part B: Discrimination Based on Deformation Wave
  IV. Deformation Wave
  V. Data Analysis (Processing Phase)

Part A: Touch Detection

I. Introduction

A. Device Overview

Figure 1:
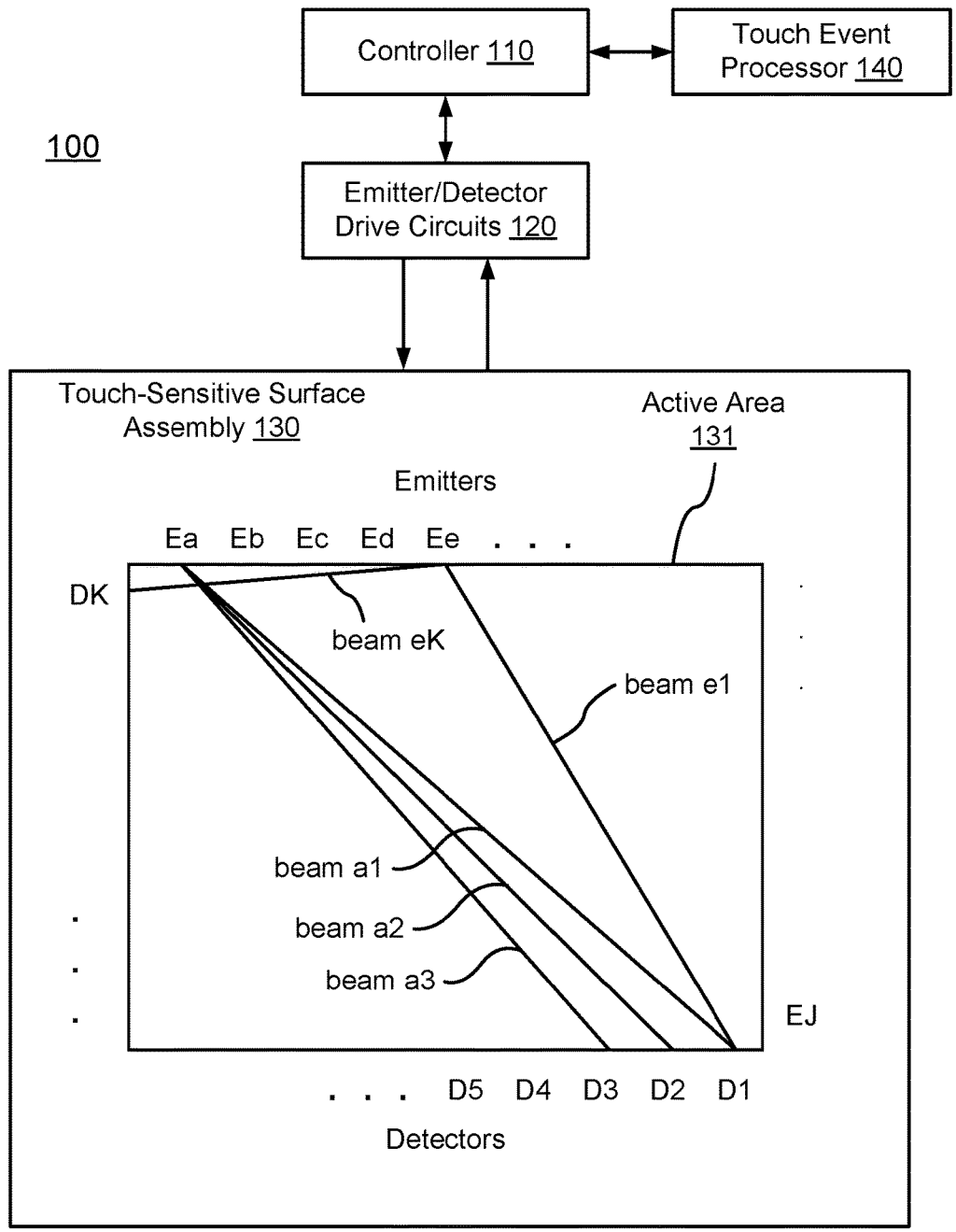
FIG. 1 is a diagram of an optical touch-sensitive device, according to one embodiment.

FIG. 1 is a diagram of an optical touch-sensitive device 100, according to one embodiment. The optical touch-sensitive device 100 includes a controller 110, emitter/detector drive circuits 120, and a touch-sensitive surface assembly 130. The surface assembly 130 includes a surface 131 over which touch events are to be detected. For convenience, the area defined by surface 131 may sometimes be referred to as the active area or active surface, even though the surface itself may be an entirely passive structure. The assembly 130 also includes emitters and detectors arranged along the periphery of the active surface 131. In this example, there are J emitters labeled as Ea-EJ and K detectors labeled as D1-DK. The device also includes a touch event processor 140, which may be implemented as part of the controller 110 or separately as shown in FIG. 1. A standardized API may be used to communicate with the touch event processor 140, for example between the touch event processor 140 and controller 110, or between the touch event processor 140 and other devices connected to the touch event processor.

The emitter/detector drive circuits 120 serve as an interface between the controller 110 and the emitters Ej and detectors Dk. The emitters produce optical "beams" which are received by the detectors. Preferably, the light produced by one emitter is received by more than one detector, and each detector receives light from more than one emitter. For convenience, "beam" will refer to the light from one emitter to one detector, even though it may be part of a large fan of light that goes to many detectors rather than a separate beam.

The beam from emitter Ej to detector Dk will be referred to as beam jk. FIG. 1 expressly labels beams a1, a2, a3, e1 and eK as examples. Touches within the active area 131 will disturb certain beams, thus changing what is received at the detectors Dk. Data about these changes is communicated to the touch event processor 140, which analyzes the data to determine the location(s) (and times) of touch events on surface 131.

One advantage of an optical approach as shown in FIG. 1 is that this approach scales well to larger screen sizes. Since the emitters and detectors are positioned around the periphery, increasing the screen size by a linear factor of N means that the periphery also scales by a factor of N rather than $N^2$.

These touch-sensitive devices can be used in various applications. Touch-sensitive displays are one class of application. This includes displays for tablets, laptops, desktops, gaming consoles, smart phones and other types of compute devices. It also includes displays for TVs, digital signage, public information, whiteboards, e-readers and other types of good resolution displays. However, they can also be used on smaller or lower resolution displays: simpler zone phones, user controls (photocopier controls, printer controls, control of appliances, etc.). These touch-sensitive devices can also be used in applications other than displays. The "surface" over which the touches are detected could be a passive element, such as a printed image or simply some hard surface. This application could be used as a user interface, similar to a trackball or mouse.

B. Process Overview

FIG. 2 is a flow diagram for determining the locations of touch events, according to one embodiment. This process will be illustrated using the device of FIG. 1. The process 200 is roughly divided into two phases, which will be referred to as a physical phase 210 and a processing phase 220. Conceptually, the dividing line between the two phases is a set of transmission coefficients Tjk.

The transmission coefficient Tjk is the transmittance of the optical beam from emitter j to detector k, compared to what would have been transmitted if there was no touch event interacting with the optical beam. In the following examples, we will use a scale of 0 (fully blocked beam) to 1 (fully transmitted beam). Thus, a beam jk that is undisturbed by a touch event has Tjk=1. A beam jk that is fully blocked by a touch event has a Tjk=0. A beam jk that is partially blocked or attenuated by a touch event has 0<Tjk<1. It is possible for Tjk>1, for example depending on the nature of the touch interaction or in cases where light is deflected or scattered to detectors k that it normally would not reach.

The use of this specific measure is purely an example. Other measures can be used. In particular, since we are most interested in interrupted beams, an inverse measure such as (1−Tjk) may be used since it is normally 0. Other examples include measures of absorption, attenuation, reflection or scattering. In addition, although FIG. 2 is explained using Tjk as the dividing line between the physical phase 210 and the processing phase 220, it is not required that Tjk be expressly calculated. Nor is a clear division between the physical phase 210 and processing phase 220 required.

Also note that the Tjk may have a temporal aspect. Different optical beams may be transmitted at different times, so that the corresponding Tjk have a certain timing. In addition, each optical beam typically is transmitted repeatedly at different times, for example at a certain scan rate for the device, so that there are multiple Tjk for each beam jk corresponding to different sample times. To simplify the explanation, the temporal aspect will not be expressly considered, but it should be understood that the principles described can be extended to include this temporal aspect.

Returning to FIG. 2, the physical phase 210 is the process of determining the Tjk from the physical setup. The processing phase 220 determines the touch events from the Tjk. The model shown in FIG. 2 is conceptually useful because it somewhat separates the physical setup and underlying physical mechanisms from the subsequent processing.

For example, the physical phase 210 produces transmission coefficients Tjk. Many different physical designs for the touch-sensitive surface assembly 130 are possible, and different design tradeoffs will be considered depending on the end application. For example, the emitters and detectors may be narrower or wider, narrower angle or wider angle, various wavelengths, various powers, coherent or not, etc. As another example, different types of multiplexing may be used to allow beams from multiple emitters to be received by each detector. Several of these physical setups and manners of operation are described below, primarily in Section II.

The interior of block 210 shows one possible implementation of process 210. In this example, emitters transmit 212 beams to multiple detectors. Some of the beams travelling across the touch-sensitive surface are disturbed by touch events. The detectors receive 214 the beams from the emitters in a multiplexed optical form. The received beams are de-multiplexed 216 to distinguish individual beams jk from each other. Transmission coefficients Tjk for each individual beam jk are then determined 218.

The processing phase 220 can also be implemented in many different ways. Candidate touch points, line imaging, location interpolation, touch event templates and multi-pass approaches are all examples of techniques that may be used as part of the processing phase 220. Several of these are described below, primarily in Section III.

II. Physical Set-up

The touch-sensitive device 100 may be implemented in a number of different ways. The following are some examples of design variations.

A. Electronics

With respect to electronic aspects, note that FIG. 1 is exemplary and functional in nature. Functions from different boxes in FIG. 1 can be implemented together in the same component.

For example, the controller 110 and touch event processor 140 may be implemented as hardware, software or a combination of the two. They may also be implemented together (e.g., as an SoC with code running on a processor in the SoC) or separately (e.g., the controller as part of an ASIC, and the touch event processor as software running on a separate processor chip that communicates with the ASIC). Example implementations include dedicated hardware (e.g., ASIC or programmed field programmable gate array (FPGA)), and microprocessor or microcontroller (either embedded or standalone) running software code (including firmware). Software implementations can be modified after manufacturing by updating the software.

The emitter/detector drive circuits 120 serve as an interface between the controller 110 and the emitters and detectors. In one implementation, the interface to the controller 110 is at least partly digital in nature. With respect to emitters, the controller 110 may send commands controlling the operation of the emitters. These commands may be instructions, for example a sequence of bits which mean to take certain actions: start/stop transmission of beams, change to a certain pattern or sequence of beams, adjust power, power up/power down circuits. They may also be simpler signals, for example a "beam enable signal," where the emitters transmit beams when the beam enable signal is high and do not transmit when the beam enable signal is low.

The circuits 120 convert the received instructions into physical signals that drive the emitters. For example, circuit 120 might include some digital logic coupled to digital to analog converters, in order to convert received digital instructions into drive currents for the emitters. The circuit 120 might also include other circuitry used to operate the emitters: modulators to impress electrical modulations onto the optical beams (or onto the electrical signals driving the emitters), control loops and analog feedback from the emitters, for example. The emitters may also send information to the controller, for example providing signals that report on their current status.

With respect to the detectors, the controller 110 may also send commands controlling the operation of the detectors, and the detectors may return signals to the controller. The detectors also transmit information about the beams received by the detectors. For example, the circuits 120 may receive raw or amplified analog signals from the detectors. The circuits then may condition these signals (e.g., noise suppression), convert them from analog to digital form, and perhaps also apply some digital processing (e.g., demodulation).

B. Touch Interactions

Figure 3A:
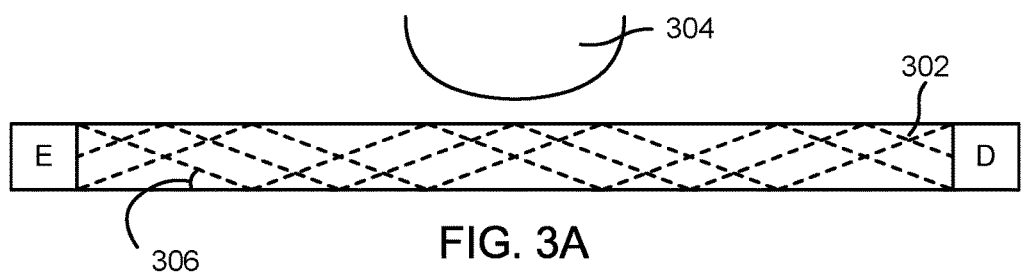
FIGS. 3A-3B illustrate a frustrated TIR mechanism for a touch interaction with an optical beam.
Figure 3B:
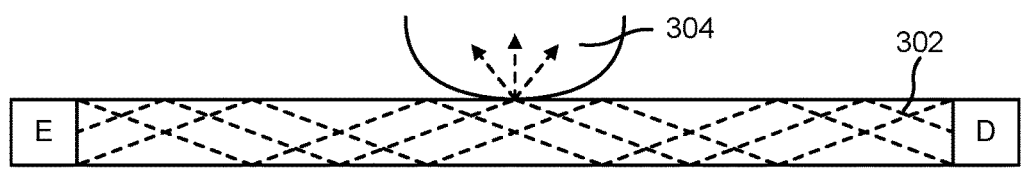

Different mechanisms for a touch interaction with an optical beam can be used. One example is frustrated total internal reflection (TIR). In frustrated TIR, an optical beam is confined to an optical waveguide by total internal reflection and the touch interaction disturbs the total internal reflection in some manner. FIGS. 3A-3B illustrate a frustrated TIR mechanism for a touch interaction with an optical beam. In FIG. 3A, the optical beam, shown as a dashed line, travels from emitter E to detector D through an optically transparent planar waveguide 302. The beam is confined to the waveguide 302 by total internal reflection. The waveguide may be constructed of plastic or glass, for example. In FIG. 3B, an object 304, such as a finger or stylus, coming into contact with the transparent waveguide 302, has a higher refractive index than the air normally surrounding the waveguide. Over the area of contact, the increase in the refractive index due to the object disturbs the total internal reflection of the beam within the waveguide. The disruption of total internal reflection increases the light leakage from the waveguide, attenuating any beams passing through the contact area. Correspondingly, removal of the object 304 will stop the attenuation of the beams passing through. Attenuation of the beams passing through the touch point will result in less power at the detectors, from which the reduced transmission coefficients Tjk can be calculated.

The touch interactions can be direct or indirect. In a direct interaction, the touching object (e.g., a finger or stylus) is the object that interacts with the optical beam. For example, a finger may have a higher index of refraction than air, thus frustrating TIR when the finger comes into direct contact with a waveguide. In an indirect interaction, the touching object interacts with an intermediate object, which interacts with the optical beam. For example, the finger may cause a high index object to come into contact with the waveguide, or may cause a change in the index of refraction of the waveguide or surrounding materials.

Figure 3C:
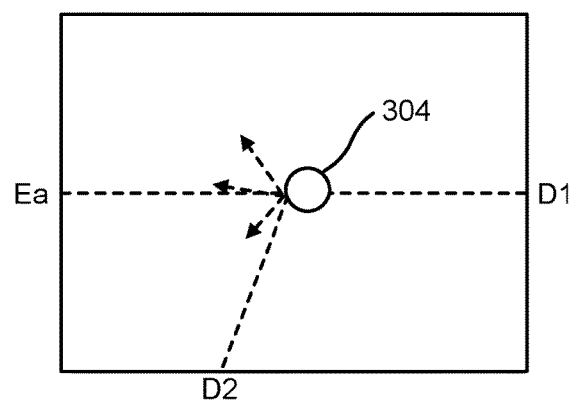
FIG. 3C illustrates a touch interaction with an optical beam enhancing transmission.

Note that some types of touch interactions can be used to measure contact pressure or touch velocity, in addition to the presence of touches. Also note that some touch mechanisms may enhance transmission, instead of or in addition to reducing transmission. FIG. 3C illustrates a touch interaction with an optical beam enhancing transmission. FIG. 3C is a top view. Emitter Ea normally produces a beam that is received by detector D1. When there is no touch interaction, Ta1=1 and Ta2=0. However, a touch interaction 304 blocks the beam from reaching detector D1 and scatters some of the blocked light to detector D2. Thus, detector D2 receives more light from emitter Ea than it normally would. Accordingly, when there is a touch event 304, Ta1 decreases and Ta2 increases. For simplicity, in the remainder of this description, the touch mechanism will be assumed to be primarily of a blocking nature, meaning that a beam from an emitter to a detector will be partially or fully blocked by an intervening touch event. This is not required, but it is convenient to illustrate various concepts.

For convenience, the touch interaction mechanism may sometimes be classified as either binary or analog. A binary interaction is one that basically has two possible responses as a function of the touch. Examples includes non-blocking and fully blocking, or non-blocking and 10%+attenuation, or not frustrated and frustrated TIR. An analog interaction is one that has a "grayscale" response to the touch: non-blocking passing through gradations of partially blocking to blocking.

C. Emitters, Detectors and Couplers

Each emitter transmits light to a number of detectors. Usually, each emitter outputs light to more than one detector simultaneously. Similarly, each detector receives light from a number of different emitters. The optical beams may be visible, infrared and/or ultraviolet light. The term "light" is meant to include all of these wavelengths and terms such as "optical" are to be interpreted accordingly.

Examples of the optical sources for the emitters include light emitting diodes (LEDs) and semiconductor lasers. IR sources can also be used. Modulation of optical beams can be achieved by directly modulating the optical source or by using an external modulator, for example a liquid crystal modulator or a deflected mirror modulator. Examples of sensor elements for the detector include charge coupled devices, photodiodes, photoresistors, phototransistors, and nonlinear all-optical detectors. Typically, the detectors output an electrical signal that is a function of the intensity of the received optical beam.

The emitters and detectors may also include optics and/or electronics in addition to the main optical source and sensor element. For example, optics can be used to couple between the emitter/detector and the desired beam path. Optics can also reshape or otherwise condition the beam produced by the emitter or accepted by the detector. These optics may include lenses, Fresnel lenses, mirrors, filters, non-imaging optics and other optical components.

In this disclosure, the optical paths will be shown unfolded for clarity. Thus, sources, optical beams and sensors will be shown as lying in one plane. In actual implementations, the sources and sensors typically will not lie in the same plane as the optical beams. Various coupling approaches can be used. A planar waveguide or optical fiber may be used to couple light to/from the actual beam path. Free space coupling (e.g., lenses and mirrors) may also be used. A combination may also be used, for example waveguided along one dimension and free space along the other dimension. Various coupler designs are described in U.S. Application Ser. No. 61/510,989 "Optical Coupler" filed on Jul. 22, 2011, which is incorporated by reference in its entirety herein.

D. Optical Beam Paths

Another aspect of a touch-sensitive system is the shape and location of the optical beams and beam paths. In FIGS. 1-2, the optical beams are shown as lines. These lines should be interpreted as representative of the beams, but the beams themselves may be different shapes and footprints. A point emitter and point detector produce a narrow "pencil" beam with a line-like footprint. A point emitter and wide detector (or vice versa) produces a fan-shaped beam with a triangular footprint. A wide emitter and wide detector produces a "rectangular" beam with a rectangular footprint of fairly constant width. Depending on the width of the footprint, the transmission coefficient Tjk behaves as a binary or as an analog quantity. It is binary if the transmission coefficient transitions fairly abruptly from one extreme value to the other extreme value as a touch point passes through the beam. For example, if the beam is very narrow, it will either be fully blocked or fully unblocked. If the beam is wide, it may be partially blocked as the touch point passes through the beam, leading to a more analog behavior.

Beams may have footprints in both the lateral (horizontal) direction, as well as in the vertical direction. The lateral footprint of a beam may be the same or different from the horizontal footprint of a beam.

Figure 4A:
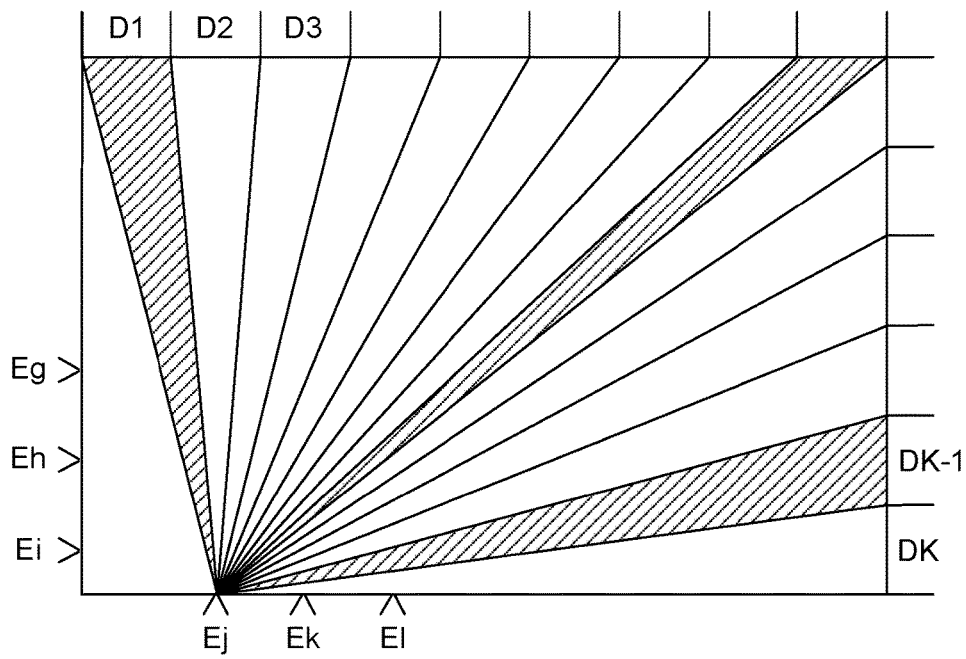
FIGS. 4A-4B are top views illustrating active area coverage by emitters or detectors, respectively.
Figure 4B:
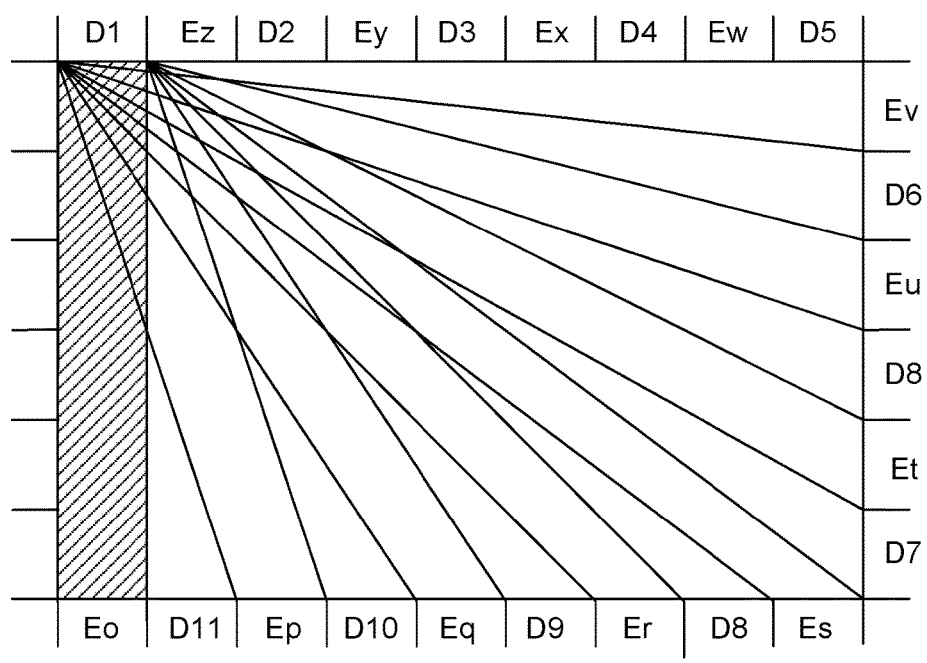

FIGS. 4A-4B are top views illustrating active area coverage by emitters and detectors. As above, the emitters and detectors are arranged along the periphery of the active area. All the emitters may be arranged on two sides of the active area, for example two adjacent perpendicular sides as illustrated in FIG. 4A. Similarly, all of detectors may be arranged on the other two sides of the active area. Alternatively, the emitters and detectors may be mixed or interleaved, as in FIG. 4B. This pattern may be one emitter in between each detector, or another more complicated arrangement.

FIG. 4A is a top view illustrating the beam pattern produced by a point emitter. Emitter Ej transmits beams to wide detectors D1-DK. Three beams are shaded for clarity: beam j1, beam j(K−1) and an intermediate beam. Each beam has a fan-shaped footprint. The aggregate of all footprints is emitter Ej's coverage area. That is, any touch event that falls within emitter Ej's coverage area will disturb at least one of the beams from emitter Ej.

FIG. 4B is a similar diagram, except the diagram is shown from the detector's point of view and the emitters are wide and produce beams with "rectangular" footprints (actually, quadrilateral but we will refer to them as rectangular). Detector D1 receives beams from emitters Eo-Ev. Beam o1 is shaded for clarity. The aggregate of all footprints is detector D1's coverage area. That is, any touch event that falls within detector D1's coverage area will disturb at least one of the beams from detector D1.

In most implementations, each emitter and each detector will support multiple beam paths, although there may not be a beam from each emitter to every detector. The aggregate of the footprints from all beams from one emitter (or to one detector) will be referred to as that emitter's (detector's) coverage area. The coverage areas for all emitters or detectors can be aggregated to obtain the overall coverage for the system.

The footprints of individual beams can be described using different quantities: spatial extent (i.e., width), angular extent (i.e., radiant angle for emitters, acceptance angle for detectors) and footprint shape. An individual beam path from one emitter to one detector can be described by the emitter's width, the detector's width and/or the angles and shape defining the beam path between the two. An emitter's coverage area can be described by the emitter's width, the aggregate width of the relevant detectors and/or the angles and shape defining the aggregate of the beam paths from the emitter. Note that the individual footprints may overlap. The ratio of (the sum of an emitter's footprints)/(emitter's cover area) is one measure of the amount of overlap.

E. Multiplexing

Since multiple emitters transmit multiple optical beams to multiple detectors, and since the behavior of individual beams is generally desired, a multiplexing/demultiplexing scheme is used. For example, each detector typically outputs a single electrical signal indicative of the intensity of the incident light, regardless of whether that light is from one optical beam produced by one emitter or from many optical beams produced by many emitters. However, the transmittance $T_{jk}$ is a characteristic of an individual optical beam jk.

Different types of multiplexing can be used. Depending upon the multiplexing scheme used, the transmission characteristics of beams, including their content and when they are transmitted, may vary. Consequently, the choice of multiplexing scheme may affect both the physical construction of the optical touch-sensitive device as well as its operation.

One approach is based on code division multiplexing. In this approach, the optical beams produced by each emitter are encoded using different codes. A detector receives an optical signal which is the combination of optical beams from different emitters, but the received beam can be separated into its components based on the codes. This is described in further detail in U.S. application Ser. No. 13/059,772 "Optical Control System With Modulated Emitters," which is incorporated by reference herein.

Another similar approach is frequency division multiplexing. In this approach, rather than modulated by different codes, the optical beams from different emitters are modulated by different frequencies. The frequencies are low enough that the different components in the detected optical beam can be recovered by electronic filtering or other electronic or software means.

Time division multiplexing can also be used. In this approach, different emitters transmit beams at different times. The optical beams and transmission coefficients $T_{jk}$ are identified based on timing. If only time multiplexing is used, the controller must cycle through the emitters quickly enough to meet the required touch sampling rate.

Other multiplexing techniques commonly used with optical systems include wavelength division multiplexing, polarization multiplexing, spatial multiplexing and angle multiplexing. Electronic modulation schemes, such as PSK, QAM and OFDM, may also be possibly applied to distinguish different beams.

Several multiplexing techniques may be used together. For example, time division multiplexing and code division multiplexing could be combined. Rather than code division multiplexing 128 emitters or time division multiplexing 128 emitters, the emitters might be broken down into 8 groups of 16. The 8 groups are time division multiplexed so that only 16 emitters are operating at any one time, and those 16 emitters are code division multiplexed. This might be advantageous, for example, to minimize the number of emitters active at any given point in time to reduce the power requirements of the device.

III. Processing Phase

In the processing phase 220 of FIG. 2, the transmission coefficients $T_{jk}$ are used to determine the locations of touch points. Different approaches and techniques can be used, including candidate touch points, line imaging, location interpolation, touch event templates, multi-pass processing and beam weighting.

A. Candidate Touch Points

One approach to determine the location of touch points is based on identifying beams that have been affected by a touch event (based on the transmission coefficients $T_{jk}$) and then identifying intersections of these interrupted beams as candidate touch points. The list of candidate touch points can be refined by considering other beams that are in proximity to the candidate touch points or by considering other candidate touch points. This approach is described in further detail in U.S. patent application Ser. No. 13/059,817, "Method and Apparatus for Detecting a Multitouch Event in an Optical Touch-Sensitive Device," which is incorporated herein by reference.

B. Line Imaging, Tomography

This technique is based on the concept that the set of beams received by a detector form a line image of the touch points, where the viewpoint is the detector's location. The detector functions as a one-dimensional camera that is looking at the collection of emitters. Due to reciprocity, the same is also true for emitters. The set of beams transmitted by an emitter form a line image of the touch points, where the viewpoint is the emitter's location. These line images can be processed to reconstruct the touch points, for example by using correlation or tomography principles. This approach is described in further detail in U.S. patent application Ser. No. 13/460,703, "Detecting Multitouch Events in an Optical Touch-Sensitive Device using Touch Event Templates," and Ser. No. 14/092,850, "Optical Touch Tomography," which are incorporated herein by reference.

C. Location Interpolation

Applications typically will require a certain level of accuracy in locating touch points. One approach to increase accuracy is to increase the density of emitters, detectors and beam paths so that a small change in the location of the touch point will interrupt different beams. Another approach is to interpolate between beams. This approach is described in further detail in U.S. patent application Ser. No. 13/460,703, "Detecting Multitouch Events in an Optical Touch-Sensitive Device using Touch Event Templates," which is incorporated herein by reference.

D. Touch Event Templates

If the locations and shapes of the beam paths are known, which is typically the case for systems with fixed emitters, detectors and optics, it is possible to predict in advance the transmission coefficients for a given touch event. Templates can be generated a priori for expected touch events. The determination of touch events then becomes a template matching problem.

If a brute force approach is used, then one template can be generated for each possible touch event. However, this can result in a large number of templates. For example, assume that one class of touch events is modeled as oval contact areas and assume that the beams are pencil beams that are either fully blocked or fully unblocked. This class of touch events can be parameterized as a function of five dimensions: length of major axis, length of minor axis, orientation of major axis, x location within the active area and y location within the active area. A brute force exhaustive set of templates covering this class of touch events must span these five dimensions. In addition, the template itself may have a large number of elements.

Thus, in another approach, the set of templates is simplified. For example, one possible template for a touch event with a certain contact area is the set of all beam paths that would be affected by the touch. However, this is a large number of beam paths, so template matching will be more difficult. In addition, this template is very specific to contact area. If the contact area changes slightly in size, shape or position, the template for contact area will no longer match exactly. Also, if additional touches are present elsewhere in the active area, the template will not match the detected data well. Thus, although using all possible beam paths can produce a fairly discriminating template, it can also be computationally intensive to implement. An alternative uses templates with less than all affected beams. For example, a simpler template may be based on only four beams that would be interrupted by a certain contact area. This is a less specific template since other contact areas of slightly different shape, size or location will still match this template. This is good in the sense that fewer templates will be required to cover the space of possible contact areas. This template is less precise than the full template based on all interrupted beams. However, it is also faster to match due to the smaller size. These types of templates often are sparse relative to the full set of possible transmission coefficients.

Note that a series of templates could be defined for a certain contact area, increasing in the number of beams contained in the template: a 2-beam template, a 4-beam template, etc. In one embodiment, the beams that are interrupted by contact area are ordered sequentially from 1 to N. An n-beam template can then be constructed by selecting the first n beams in the order. Generally speaking, beams that are spatially or angularly diverse tend to yield better templates. That is, a template with three beams running at 60 degrees to each other and not intersecting at a common point tends to produce a more robust template than one based on three largely parallel beams which are in close proximity to each other. In addition, more beams tends to increase the effective signal-to-noise ratio of the template matching, particularly if the beams are from different emitters and detectors.

Often, a base template can also be used to generate a family of similar templates. For example, contact area B may be is the same as contact area A, but shifted to the right. The corresponding four-beam template for contact area B can then be generated from the template for contact area A, by making use of the right shift. More generally, the template for contact area A can be abstracted or parameterized (e.g., where the parameters are the amount of shift in different directions). The abstraction will be referred to as a template model. In one approach, the model is used to generate the individual templates and the actual data is matched against each of the individual templates. In another approach, the data is matched against the template model. The matching process then includes determining whether there is a match against the template model and, if so, which value of the parameters produces the match.

Templates can use both positive and negative regions. An actual contact area may be surrounded by a "touch-free" zone. If contact is made in the actual contact area, then there will be no contact in the immediately surrounding area. Thus, the template includes both (a) beams in the contact area that are interrupted, and (b) beams in the shaded area that are not interrupted.

Templates can also be based both on reduced and enhanced transmission coefficients. For a particular type of contact, the transmission coefficients for certain beams that are interrupted should decrease. However, the touch interaction may scatter or reflect light in other directions, and the transmission coefficients for these directions should increase.

Other templates will be apparent and templates can be processed in a number of ways. In a straightforward approach, the disturbances for the beams in a template are simply summed or averaged. This can increase the overall SNR for such a measurement, because each beam adds additional signal while the noise from each beam is presumably independent. In another approach, the sum or other combination could be a weighted process, where not all beams in the template are given equal weight. For example, the beams which pass close to the center of the touch event being modeled could be weighted more heavily than those that are further away. Alternately, the angular diversity of beams in the template could also be expressed by weighting. Angular diverse beams are more heavily weighted than beams that are not as diverse.

Additional examples of touch event templates are described in further detail in U.S. patent application Ser. No. 13/460,703, "Detecting Multitouch Events in an Optical Touch-Sensitive Device using Touch Event Templates," which is incorporated herein by reference.

E. Multi-Pass Processing

Referring to FIG. 2, the processing phase need not be a single-pass process nor is it limited to a single technique. Multiple processing techniques may be combined or otherwise used together to determine the locations of touch events.

As one example, a first stage is a coarse pass that relies on a fast binary template matching. In this stage, the templates are binary and the transmittances T'jk are also assumed to be binary. The binary transmittances T'jk can be generated from the analog values Tjk by rounding or thresholding the analog values. The binary values T'jk are matched against binary templates to produce a preliminary list of candidate touch points. Some clean-up is performed to refine this list. For example, it may be simple to eliminate redundant candidate touch points or to combine candidate touch points that are close or similar to each other. A second stage is used to eliminate false positives, using a more refined approach. For each candidate touch point, neighboring beams may be used to validate or eliminate the candidate as an actual touch point. The techniques described in U.S. patent application Ser. No. 13/059,817 may be used for this purpose. This stage may also use the analog values Tjk, in addition to accounting for the actual width of the optical beams. The output of stage is a list of confirmed touch points. The final stage refines the location of each touch point. For example, the interpolation techniques described previously can be used to determine the locations with better accuracy. Since the approximate location is already known, stage may work with a much smaller number of beams (i.e., those in the local vicinity) but might apply more intensive computations to that data. The end result is a determination of the touch locations.

Other techniques may also be used for multi-pass processing. For example, line images or touch event models may also be used. Alternatively, the same technique may be used more than once or in an iterative fashion. For example, low resolution templates may be used first to determine a set of candidate touch locations, and then higher resolution templates or touch event models may be used to more precisely determine the precise location and shape of the touch.

F. Beam Weighting

In processing the transmission coefficients, it is common to weight or to prioritize the transmission coefficients. Weighting effectively means that some beams are more important than others. Weightings may be determined during processing as needed, or they may be predetermined and retrieved from lookup tables or lists.

One factor for weighting beams is angular diversity. Usually, angularly diverse beams are given a higher weight than beams with comparatively less angular diversity. Given one beam, a second beam with small angular diversity (i.e., roughly parallel to the first beam) may be weighted lower because it provides relatively little additional information about the location of the touch event beyond what the first beam provides. Conversely, a second beam which has a high angular diversity relative to the first beam may be given a higher weight in determining where along the first beam the touch point occurs.

Another factor for weighting beams is position difference between the emitters and/or detectors of the beams (i.e., spatial diversity). Usually, greater spatial diversity is given a higher weight since it represents "more" information compared to what is already available.

Another possible factor for weighting beams is the density of beams. If there are many beams traversing a region of the active area, then each beam is just one of many and any individual beam is less important and may be weighted less. Conversely, if there are few beams traversing a region of the active area, then each of those beams is more significant in the information that it carries and may be weighted more.

In another aspect, the nominal beam transmittance (i.e., the transmittance in the absence of a touch event) could be used to weight beams. Beams with higher nominal transmittance can be considered to be more "trustworthy" than those which have lower nominal transmittance since those are more vulnerable to noise. A signal-to-noise ratio, if available, can be used in a similar fashion to weight beams. Beams with higher signal-to-noise ratio may be considered to be more "trustworthy" and given higher weight.

The weightings, however determined, can be used in the calculation of a figure of merit (confidence) of a given template associated with a possible touch location. Beam transmittance/signal-to-noise ratio can also be used in the interpolation process, being gathered into a single measurement of confidence associated with the interpolated line derived from a given touch shadow in a line image. Those interpolated lines which are derived from a shadow composed of "trustworthy" beams can be given greater weight in the determination of the final touch point location than those which are derived from dubious beam data.

Part B: Discrimination Based on Deformation Wave

IV. Deformation Wave

When an object contacts a touch-sensitive surface, it typically causes a deformation in the touch-sensitive surface at the point of contact, followed by a return of the surface to its original shape. This results in a mechanical motion that propagates away from the initial contact point. This mechanical motion will be referred to as a deformation wave. The deformation wave can be a combination of several types of waves, e.g., transverse wave, longitudinal wave. The attributes of the wave (e.g., amplitude, temporal shape and width, lateral shape or wavefront shape, speed of propagation, rate of attenuation) typically depend on properties of the contacting object (e.g. material properties, shape, size, design), properties of the contacted surface (e.g., material properties, construction), and parameters for the touch interaction (e.g., contact force, speed of contact).

Different types of touches may produce different deformation waves. The deformation wave may also disturb the optical beams as the deformation wave propagates along the touch-sensitive surface. By analyzing these disturbances, information about the deformation wave and hence the touch type can be determined. For example, the detection of properties of the object that contacts the touch-sensitive surface is an important attribute for many applications. This information may be used to discriminate an instrument contact (e.g., pen or stylus) from a finger contact. Some of these attributes may be determined by analyzing the deformation wave caused by the landing of the object on the touch-sensitive surface.

Figure 5D:
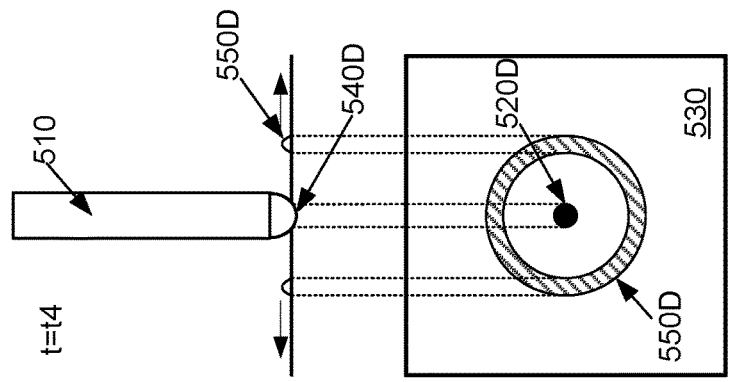
FIGS. 5A-5D are a time sequence of top and side views depicting propagation of a deformation wave over time.
Figure 5C:
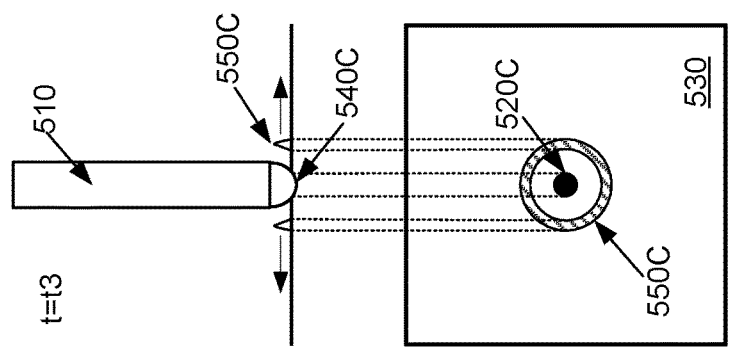
Figure 5B:
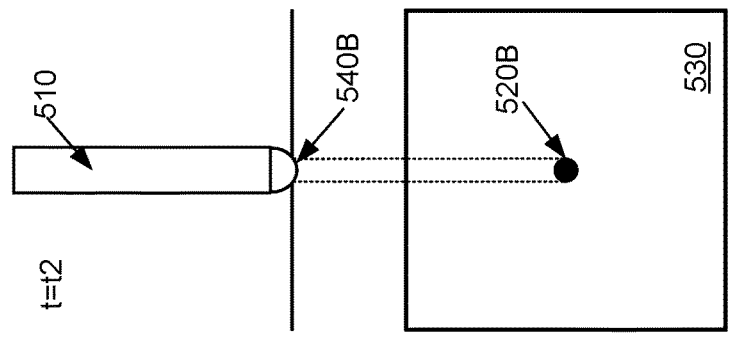
Figure 5A:
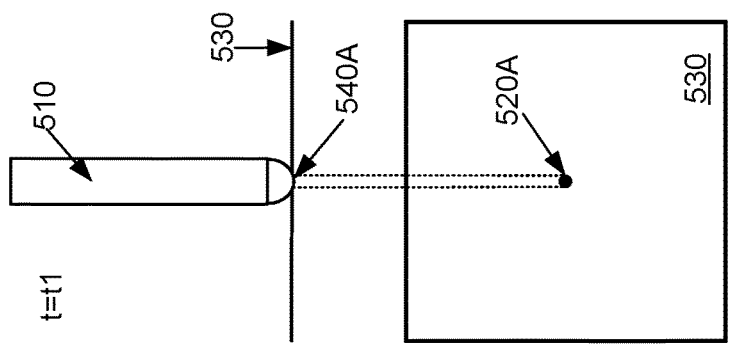

FIGS. 5A-5D are a time sequence that depicts propagation of a deformation wave over time. FIG. 5A is the earliest in time and FIG. 5D is the latest in time. Each figure shows both a side view and a top view of an object 510 contacting a touch-sensitive surface 530. The top view shows only effects on the surface 530 and does not show the object 510 itself. In FIG. 5A, the object 510 is making initial contact with the surface 530 at time t1. The contact area 520A is relatively small. The object 510 also causes a small deformation 540A in the surface 530. As the object landing proceeds, as shown at time t2 in FIG. 5B, the contact area 520B becomes larger and the surface deformation 540B also increases, both in size and depth.

In FIG. 5C, the object 510 has completed or is close to completing its initial landing at time t3. It may come to rest on the surface 530. The elasticity of the surface 530 and/or reduced force on the object 510 may result in a rebound in the surface deformation 540C. This returning process causes a vibration or deformation wave 550C, which propagates along the touch-sensitive surface 530 outside the contract area 520C. The initial point of contact is the originating location for the deformation wave 550C. FIG. 5C shows a snapshot of the deformation wave 550C at an instant in time t=t3. In the side view, the deformation wave 550C appears as two pulses propagating away from the location of the touch event. In the top view, the deformation wave 550C has a lateral shape that is annular in this example. That is, the wavefront is circular in shape. For purposes of illustration, the deformation wave is shown as a pulse of finite width. In reality, it may include multiple pulses.

FIG. 5D shows propagation of the deformation wave 550D at a later time t4, when the deformation wave 550D has had time to propagate farther away from its originating location. In this example, propagation also causes a decrease in amplitude and a spreading of the pulse. As a result, the lateral shape 550D is still annular, but at a larger diameter due to the increased distance traveled by the wave and also with a greater width due to spreading of the pulse during propagation.

Note that FIG. 5 (and the rest of the figures) are not drawn to scale and are meant to be illustrative only. For example, the deformation wave is shown in FIG. 5 as a fairly narrow pulse. This is not necessarily the case. The velocity at which a transverse wave propagates in a glass waveguide might be on the order of 3 km/s. So, for a 1 m wide surface, the wave would require 0.5 m/3 km/s=160 µs to travel from the center to the edge. The waveguide would move essentially as a unified piston for any force applied in the center of the glass where the displacement of the glass is not significant over a timescale of 160 µs. Displacement of the waveguide caused by force from a landing contact over a short time period like this will not be in-phase over the whole surface, so it will result in non-pistonic deformation of the waveguide. A hard material coming into contact with the waveguide surface may cause a transient of this short duration, so the surface will not move as a unit. A soft material may cause the energy transfer into the waveguide to be spread over many milliseconds, so the surface will move almost as a unit. In most cases, the deformation wave will not have the specific narrow pulse shape shown in the figures, but that shape is used as illustrative and the term "deformation wave" should be understood to include all deformations and movements of the touch-sensitive surface caused by the contacting object, even if they are not "wave-like".

Different touch types will cause different deformation waves, as illustrated in FIGS. 6-7. FIGS. 6-7 depict different deformation waves generated by different objects 610A-B. In this example, the objects have different hardness of the contacting tip. Each figure shows a side view and top view, as in FIG. 5. These figures correspond roughly to time t3 (FIG. 5C) in FIG. 5. That is, the deformation wave 650 has been created and has just started to propagate. There is also a graph at the top that shows the contact force between the object and the touch-sensitive surface.

Comparing FIGS. 6 and 7, the object 610A in FIG. 6 has the same size tip and same contact area 620 as the object 610B in FIG. 7, but object 610A has a harder tip than object 610B. For example, object 610B may be a finger while object 610A is a finger-sized stylus made of a hard plastic. Usually, harder objects require less time to land on the touch-sensitive surface (assuming no bouncing), because softer objects typically are also more compressible. In the case of a finger landing on a surface, some time is taken to compress the finger tip. In contrast, there is little or no compression for a hard plastic stylus. As a result, the forcing function 660A for the harder object tends to have a larger peak contact force and a shorter temporal width, as can be seen by comparing FIGS. 6 and 7. The temporal width may be defined as full width at half maximum of the displacement, although other measures may also be used. This difference in forcing function, causes a corresponding difference in surface deformation, which causes a corresponding difference in deformation wave 650A,B. The deformation wave 650A for the harder object 610A tends to have a higher amplitude (due to the larger peak contact force) and a shorter width (due to the shorter temporal width of the forcing function 660A). However, both deformation waves propagate at approximately the same speed, since that is determined primarily by material properties of the touch-sensitive surface.

Other factors also affect the deformation wave, for example the composition of the object itself. The weight of the object can also affect the contact force and also the deformation wave. For example, an instrument might have a hollow body with a loose mass inside, which causes a second impact shortly after landing. When the instrument body comes to rest on the waveguide, the loose mass continues to move inside the instrument until striking the end of the hollow region. The shape and size of the contacting tip can also affect the deformation wave. Human fingers typically have a circular or elliptical contact area within a certain size range. However, the contacting tip of a manufactured instrument can be designed to have any size or shape. Instruments, such as pens or styluses, typically have a tip that is smaller than a human finger and can be distinguished on that basis. They can also be designed to have tips of a particular shape, e.g., square-shaped, rectangular-shaped, elongated ellipse-shaped. Different objects can give rise to different deformation waves. These different deformation waves will interact differently with the optical beams. Thus, analysis of the beam interactions can be used to distinguish different touch types.

V. Data Analysis (Processing Phase)

FIG. 8 is a flow diagram of a method 800 for determining a touch type, in accordance with an embodiment. This process 800 is part of the processing phase 220 of FIG. 2, and may be performed by the optical touch-sensitive device 100 in some embodiments. Additionally, the process 800 may include different or additional steps than those described in FIG. 8.

In process 800, the optical touch-sensitive device 100 (e.g., the touch event processor 140) receives 810 a location of the touch event. The location of the touch event can be determined by the transmission coefficients Tjk using one or more approaches and techniques discussed previously in Part A of this disclosure. In this example, for purposes of explanation, it will be assumed that the location of the touch event is already determined and analysis of the deformation waves will be used to determine the touch event (rather than the location of the touch event). Knowing the location of the touch event simplifies analysis of the deformation waves because the originating location of the deformation waves is known.

The optical touch-sensitive device 100 also receives 820 information indicating disturbances of the optical beams. Some of the beams propagating across the touch-sensitive surface are disturbed by deformation waves. The transmission coefficients Tjk for the affected optical beams jk will reflect these disturbances.

The optical touch-sensitive device 100 analyzes 830 the received information to determine a touch type for the touch event. The analysis is based on the location of the touch event (which can be presumed to be the originating location of the deformation wave) and on propagation of the deformation wave along the touch-sensitive surface. The deformation wave caused by landing of the object on the touch-sensitive surface disturbs the optical beams. As described above, different types of objects and/or landings can cause different deformation waves, which are reflected in different disturbances of the optical beams.

Many of the techniques described above in the processing phase for detecting touch events, can also be used to detect or distinguish different deformation waves, thus allowing the determination of different touch types. For example, candidate touch point, line imaging and tomography, and template-based techniques can be applied to analyze deformation waves. Techniques can be especially effective if a temporal aspect is also added. Often, the speed of propagation of the deformation wave is a known constant determined primarily by the construction of the medium along which the wave propagates.

Often, the data analyzed is for optical beams that are traversing the touch-sensitive surface (a) after landing of the object (so that the deformation wave has some time to propagate) and (b) outside a contact area of the touch event (to where the deformation wave has propagated). This is in contrast to the analysis for determining the location of the touch event, which is typically based on optical beams that are traversing the touch-sensitive surface (a) during landing of the object and (b) within the contact area of the touch event.

Additionally, interaction between the initial deformation wave and secondary deformation waves may also be considered. Secondary deformation waves may be formed by reflection of the initial deformation wave from the edge of the touch surface. Interaction between the initial and secondary deformation waves may generate a pattern having wave constructive and/or destructive behaviors.

In another aspect, because the effect of the deformation wave can be weak, data for multiple optical beams that are affected by the deformation wave in a similar manner may be combined to increase the available signal. The optical touch-sensitive device 100 analyzes the combined signal rather than analyzing the signals for individual beams.

Figure 9:
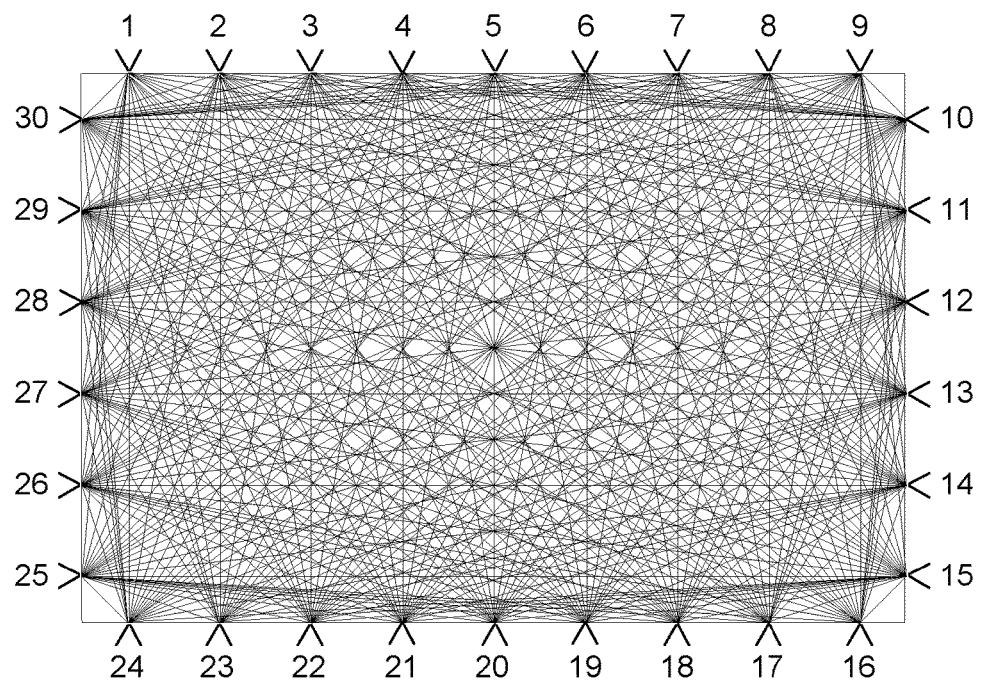
FIG. 9 is a top view illustrating all optical beams for all possible pairs of emitters and detectors.

FIGS. 9-12 illustrate some of these concepts. These figures show a top view of the touch-sensitive surface. The emitters and detectors are arranged around the periphery of the active area at the locations numbered 1-30. For purposes of each diagram, each location includes both an emitter and a detector, and the optical beams will generally be represented by a line from the emitter to the detector. FIG. 9 is a top view that shows all of the optical beams for all possible pairs of emitter and detector.

Figure 10A:
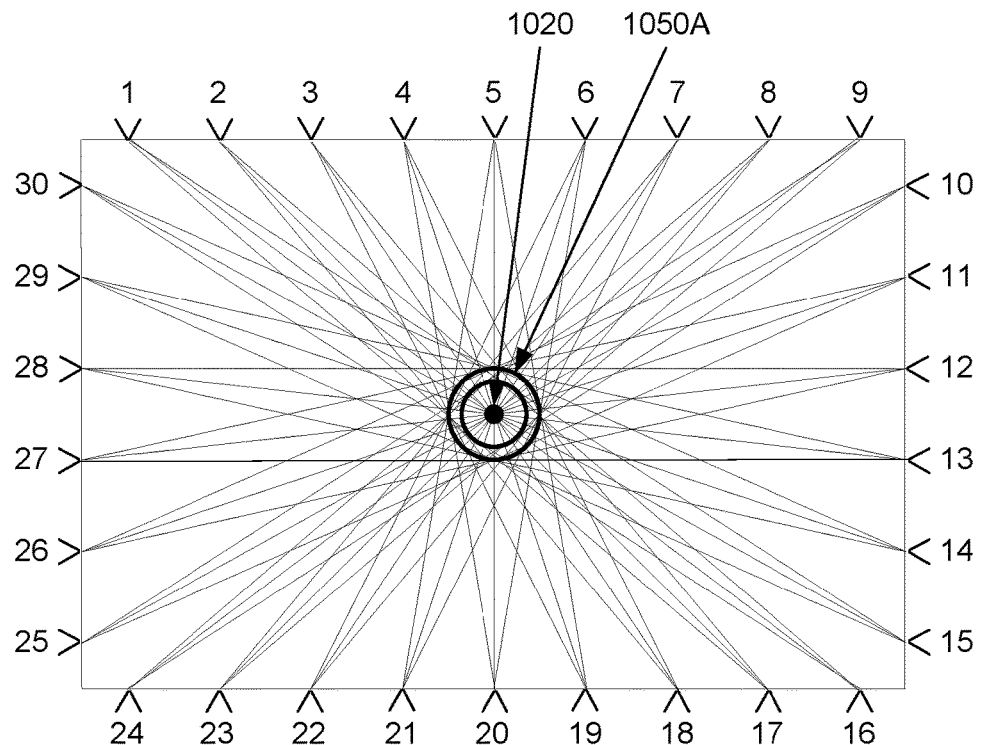
FIGS. 10A-10C are top views illustrating optical beams disturbed by a deformation wave, according to one embodiment.

FIG. 10A is a top view illustrating optical beams disturbed by a deformation wave, according to one embodiment. In this example, there is a touch in the center of the touch-sensitive surface. The touch is characterized by contact area 1020. The touch gives rise to a deformation wave 1050A, which is propagating away from the contact area 1020. FIG. 10A shows the deformation wave 1050A at a particular instant in time. FIG. 10A also shows the subset of optical beams that intersect with the deformation wave 1050A. These optical beams will be disturbed by interaction with the deformation wave 1050A.

Figure 10B:
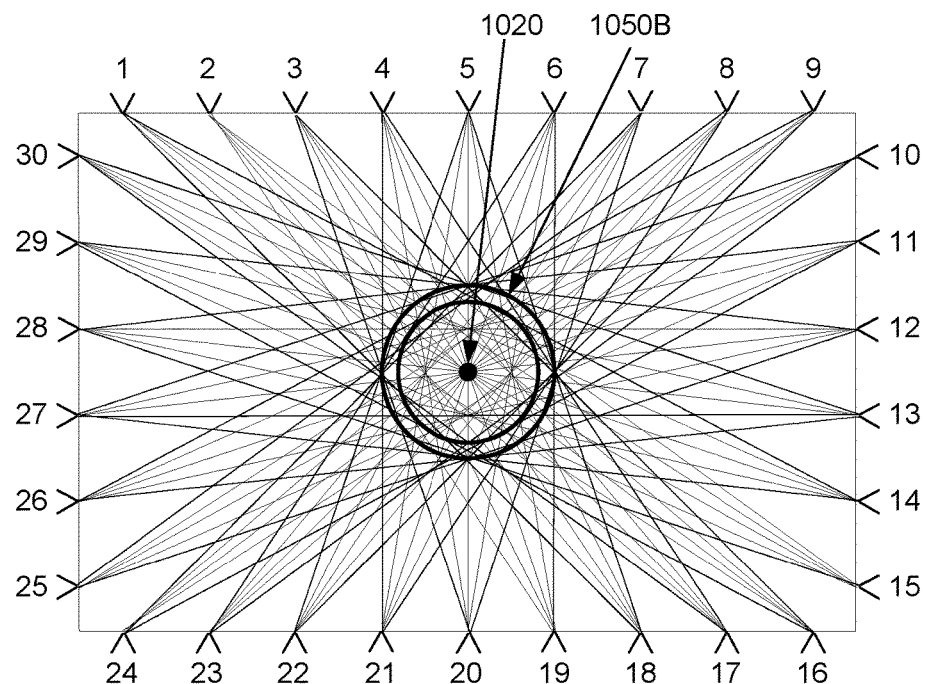

FIG. 10B shows the deformation wave 1050B at a later instant in time. The deformation wave 1050B has increased in size as it propagates away from the initial contact point and intersects a different set of optical beams than those shown in FIG. 10A. Note that certain beams are better suited to detect or to discriminate deformation waves. For example, the beam from emitter 5 to detector 20 (or vice versa), which will be referred to as beam (5-20), intersects both the earlier deformation wave 1050A in FIG. 10A and the later deformation wave 1050B. In addition, the length of intersection in both cases is the same (assuming the deformation wave has the same width). Therefore, optical beam (5-20) is not well-suited to distinguish between deformation waves 1050A and 1050B since the beam is affected similarly by both deformation waves. In addition, optical beam (5-20) also intersects the contact area 1020. If the object is still in contact with the surface, then this interaction typically will dominate any effects caused by the deformation wave. Thus, optical beam (5-20) also may not be a good beam for use in detecting deformation waves.

Figure 10C:
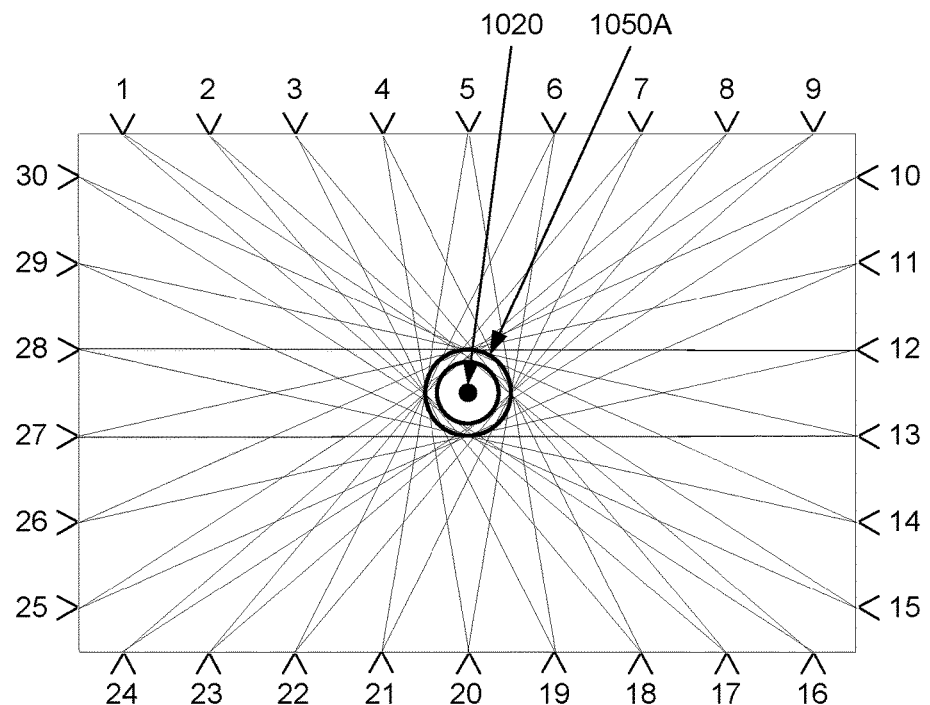

FIG. 10C is a version of FIG. 10A which shows only those optical beams which propagate "tangentially" through the deformation wave 1050A. This is the same deformation wave as in FIG. 10A. These optical beams are more strongly affected by the deformation wave because the interaction length tends to be longer. They also tend to be more distinguishing between deformation waves and also tend not to also propagate through the contact area. This illustrates that certain subsets of optical beams may be used to detect deformation waves. In this example, the subset shown is the optical beams that are tangential to the deformation wave, meaning that none of the optical beams propagate within the interior of the annulus formed by the deformation wave. Another subset could be optical beams that have at least a certain intersection length with the deformation wave, or optical beams that do not also intersect with the contact area.

Note that in FIGS. 10A-10C, multiple optical beams are simultaneously disturbed by the deformation wave. These multiple disturbed optical beams can be selected and analyzed individually. For example, in FIG. 10C, optical beam (3-19) could be analyzed for possible disturbance by a deformation wave, beam (2-18) could also be separately analyzed, and so on. Alternately, information for multiple optical beams can be combined and analyzed on an aggregate basis. For example, in FIG. 10C, the signals for all of the optical beams shown can be combined (e.g., summed or averaged) and then analyzed for possible disturbance by a deformation wave. Combining information from multiple optical beams can be used to increase the signal to noise ratio.

Detecting deformation waves also has a temporal aspect. The deformation wave is propagating, typically at a known speed since the speed depends primarily on material characteristics of the touch-sensitive surface. FIG. 10C shows which subset of optical beams are intersected by the deformation wave at a specific instant in time. This information can be used as a spatial template to detect the deformation wave. A similar diagram and template can be derived for other instants in time as the deformation wave propagates outwards from the contact point. Combining the spatial templates for many different instants in time yields a spatial-temporal template for the deformation wave.

Alternately, the template can be used as a spatial-temporal filter. Since the location of the touch event and the propagation speed of the deformation wave are known, the spatial-temporal filter can be used to select which optical beams are affected by the deformation wave. Analyzing that subset of optical beams can then yield information about the deformation wave, such as amplitude, width, rate of attenuation as the deformation wave propagates, frequency content of the deformation wave or change in frequency content as the wave propagates, or rate at which the width of the wave increases as it propagates (i.e., spreading). These, in turn, can be used to determine the touch type for the touch event. In addition, external noise sources typically propagate at a different speed than the deformation wave, so filtering based on these spatial-temporal filters can help to reduce this external noise, which results in improved signal to noise ratio.

The temporal aspect also depends on the temporal sequence for activating optical beams. In FIGS. 10A-10C, all possible optical beams are assumed to be activated simultaneously. This may occur if all emitters are continuously on, with detectors sampling the received light. Alternately, emitters may transmit pulses of a finite duration, but with all emitters transmitting their pulses at the same time. The set where each applicable optical beam has been transmitted once will be referred to as a scan, and the rate at which this occurs will be referred to as the scan rate or refresh rate. In the case of continuously transmitting emitters, the scan rate is set by the detector sampling. In the case of emitted pulses, the scan rate is set by the rate of pulse transmission.

However, not all optical beams need be transmitted at the same time. FIGS. 11A-11D show a time sequence where emitters are activated sequentially. In this example, the emitters are activated in numerical order from 1-30 and the relevant detectors are all active simultaneously for each emitter activation. Emitter 1 is activated and produces optical beams received by detectors 10-24. Emitter 2 is then activated and so on through emitter 30. FIGS. 11A-11D show a sequence of time snapshots of this activity.

Figure 11A:
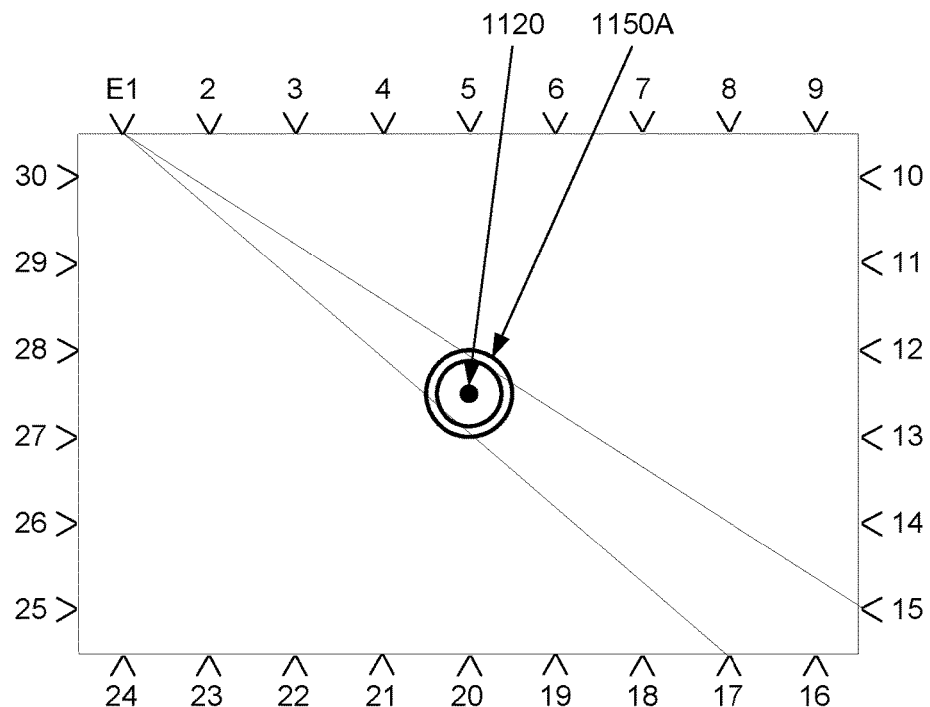
FIGS. 11A-11D are top views illustrating sequentially activated optical beams, according to one embodiment.
Figure 11B:
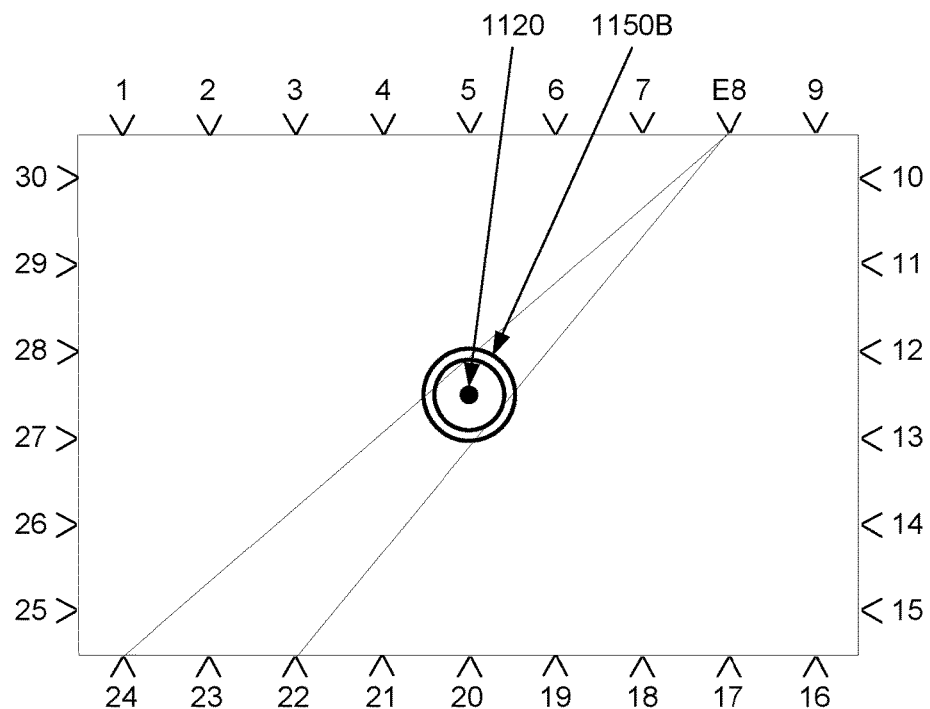
Figure 11C:
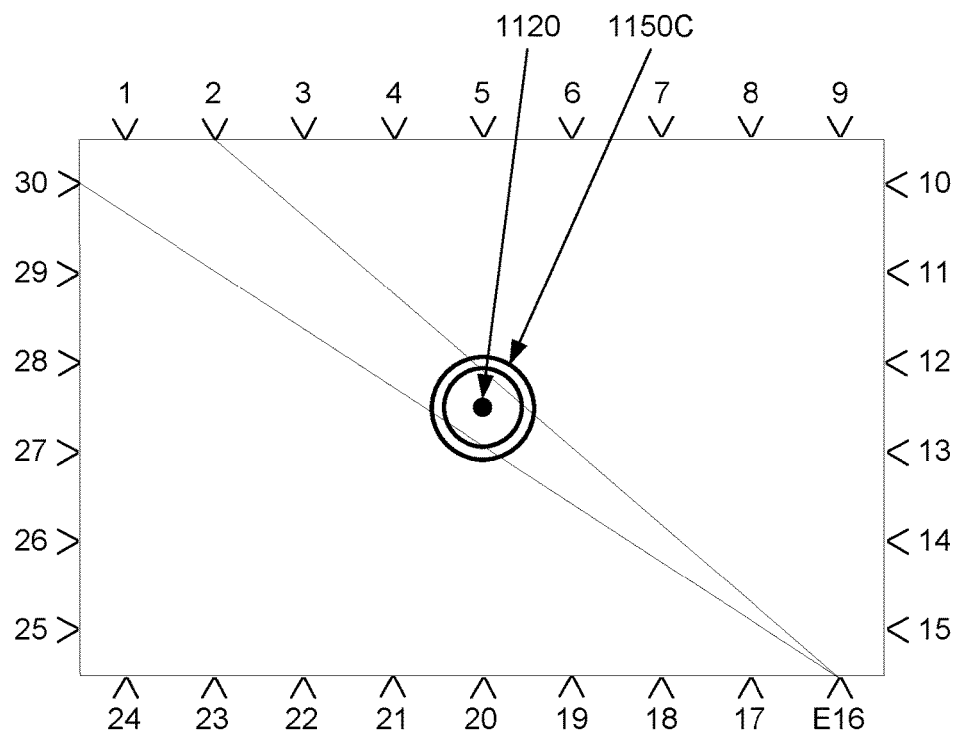

In FIG. 11A, emitter E1 is activated at time t=t1. At this time, the deformation wave is located at position 1150A. The contact area 1120 is also shown in FIG. 11A for reference. The disturbed optical beams include optical beams (1-15) and (1-17). Then emitter E2 is activated at time t=t2, then E3 at time t=t3 and so on. FIG. 11B shows when emitter E8 is activated at time t=t8. The deformation wave 1150B has propagated some from its previous position in FIG. 11A. The disturbed optical beams include optical beams (8-22) and (8-24). FIG. 11C shows when the sequence reaches emitter E16 at time t=t16. The disturbed optical beams include optical beams (16-30) and (16-2). Note that some of the optical beams produced by emitter E16 will traverse the same paths as those produced by emitters E1 and E2. For example, optical beam (16-1) traverses the same path as (1-16), just in the reverse direction, although this will not be strictly true if the optical beams are fan or otherwise asymmetrically shaped. Activation of emitters continues. When emitter E30 is activated, the scan is completed.

Figure 11D:
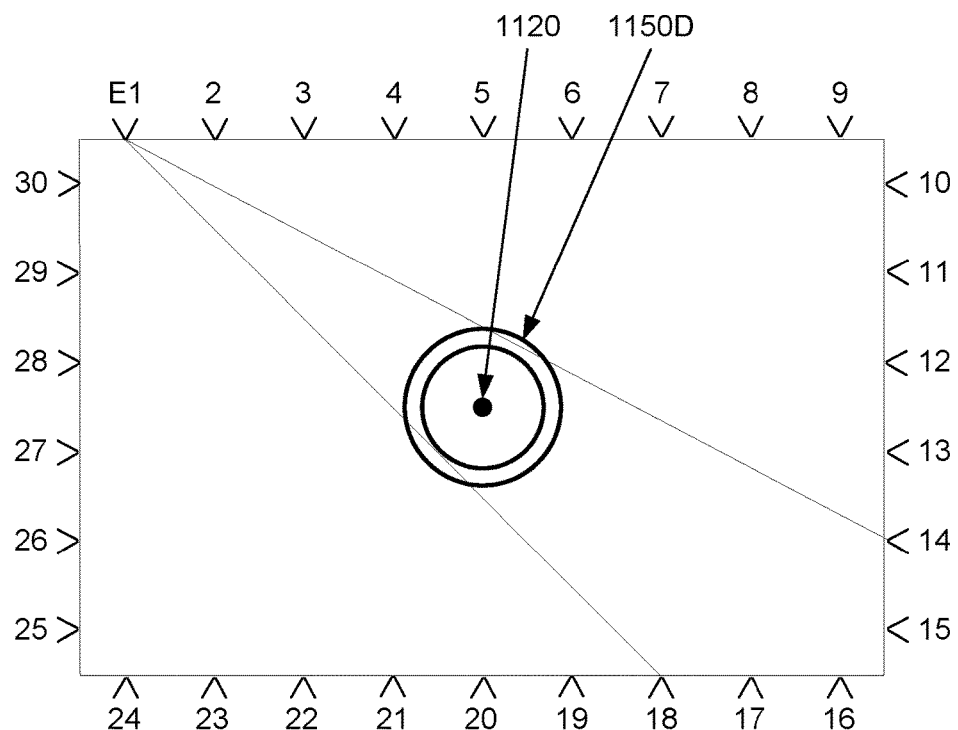

FIG. 11D shows the start of a later scan with activation of emitter E1. The deformation wave 1150D continues to propagate outward. In this case, disturbed optical beams include beams (1-14) and (1-18). Note that the deformation wave 1150D has increased in diameter but has also increased slightly in width, for example due to dispersion. Depending on the scan rate relative to the propagation speed of the deformation wave (and the size of the active area), multiple scans may be captured during propagation of the deformation wave. Thus, the spatial-temporal template or filter may include information from multiple scans.

The activation sequence may also be adjusted in real-time. In the example given above, each emitter is transmitting to all of the applicable detectors, and the emitters are activated sequentially in time. However, if the touch location is known and the optical beams are used only to interrogate the deformation wave, then not all optical beams are required. Instead, only those optical beams that traverse an expected vicinity of the deformation wave might be activated. In FIG. 11D, that might be only optical beams (1-14) and (1-18). If the touch location cannot be determined quickly enough, then information about more optical beams may be collected, but only the information from the relevant optical beams may be selected for analysis.

Figure 12A:
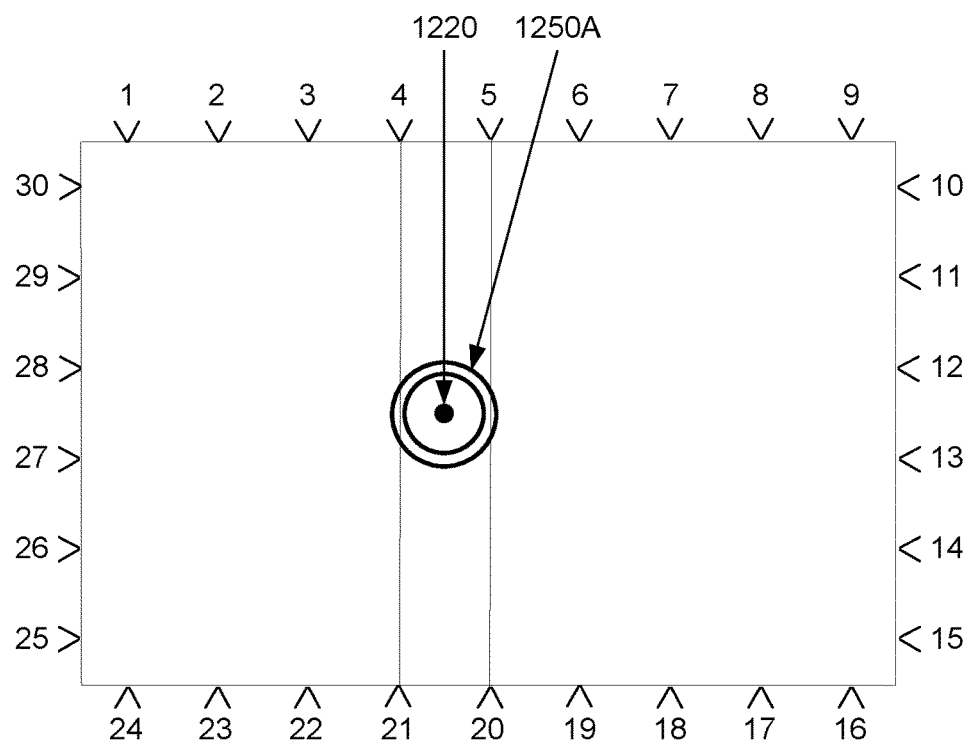
FIGS. 12A-12B are top views illustrating the use of parallel optical beams, according to one embodiment
Figure 12B:
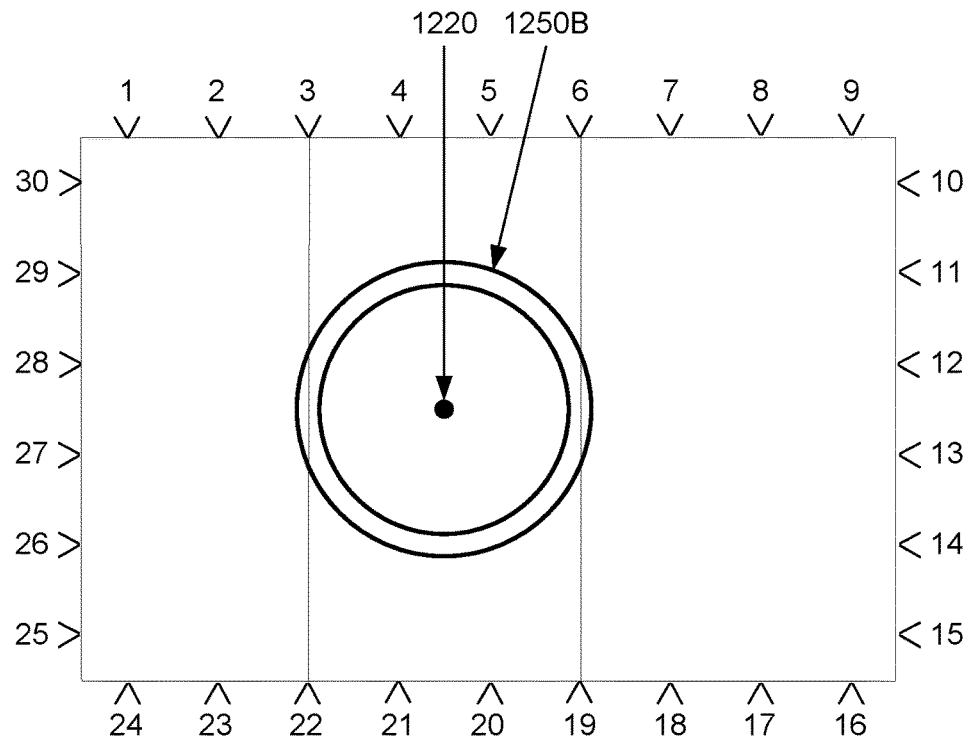

Different activation patterns are also possible. FIGS. 12A-12B show an example where parallel optical beams are activated, tracking the propagation of the deformation wave outwards from the contact area 1220. In FIG. 12A, optical beams (4-21) and (5-20) are activated, which correspond to the location of deformation wave 1250A. At a later time, in FIG. 12B, optical beams (3-22) and (6-19) are activated, which corresponds to the location of deformation wave 1250B. In this example, the touch location is known so that activation of optical beams can be coordinated. Alternately, multiple parallel beams could be activated, and then only the relevant ones selected for analysis once the touch location is known.

Figure 13:
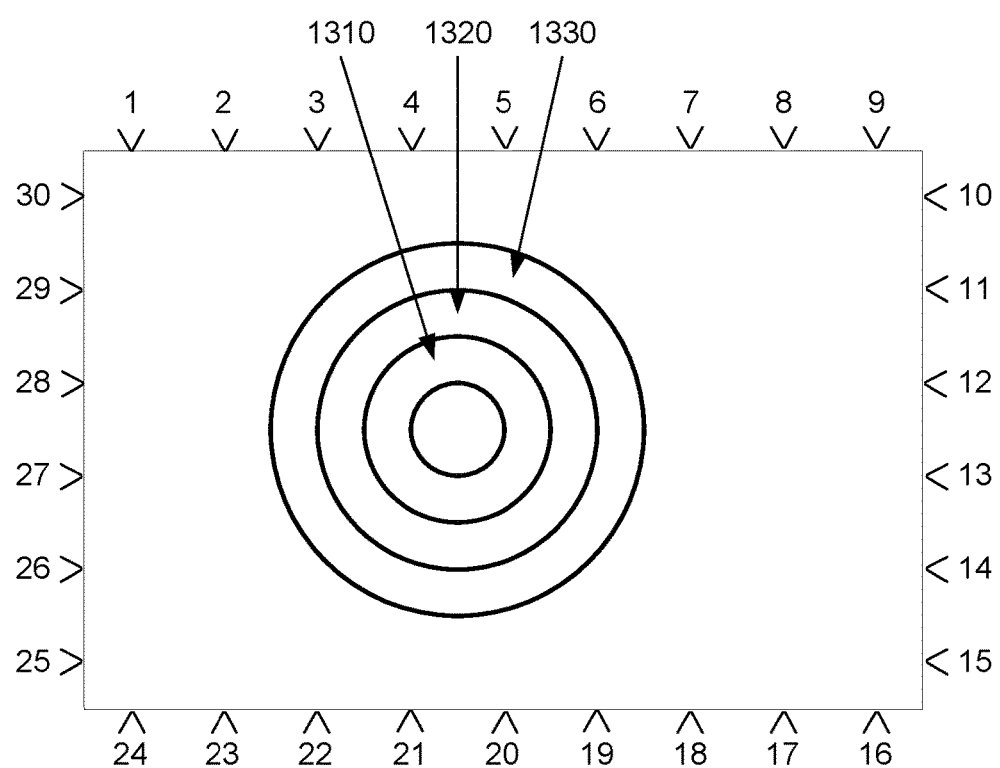
FIG. 13 is a top view illustrating the use of zones to detect a deformation wave, according to one embodiment.

In one approach, the processing for deformation waves is based on zones. Different zones correspond roughly to different time periods. FIG. 13 is a top view illustrating the use of zones to detect a deformation wave. In this example, FIG. 13 shows three zones 1310, 1320, 1330, which roughly correspond to different time periods as a deformation wave propagates outwards from the original touch location. Zone 1310 may correspond to a certain time period (t1,t2), zone 1320 to time period (t2,t3) and zone 1330 to time period (t3,t4). That is, the deformation wave is expected to be within zone 1310 during the time period from t=t1 to t=t2, and so on. The information for the transmission of optical beams can then be binned according to these zones, and then analyzed to determine characteristics of the deformation wave.

VI. Additional Considerations

The figures depict embodiments of the present invention for purposes of illustration only. One skilled in the art will readily recognize from the following discussion that alternative embodiments of the structures and methods illustrated herein may be employed without departing from the principles of the invention described herein.

For example, in addition to determining touch type, analysis of the deformation wave can also be used for other purposes. For example, the analysis based on the deformation wave can be used to improve the estimate of the location of the touch event.

The data analysis for deformation wave attributes can also provide information about the movement of the touch along the touch-sensitive surface. Estimation of the speed of travel can be done by analysis of the signal intensity, phase or spectrum of the deformation wave. A speed estimate can be useful supplementary data for a touch-sensitive sensor since it can help to estimate an expected location from one scan to the next.

As a final example, a template associated with the deformation wave corresponds to properties of a touching event. When two objects land on the touching surface, the deformation waves generated by the two contacting objects interfere with each other. This can be used to determine and track multi-touches.

Upon reading this disclosure, those of skill in the art will appreciate still additional alternative structural and functional designs through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein.

What is claimed is:

1. A method for determining a touch type for a touch event by an object on a touch-sensitive surface, the touch-sensitive surface having emitters and detectors arranged around its periphery, the emitters producing optical beams received by the detectors, the touch event disturbing the optical beams, the method comprising:
  receiving a location of the touch event;
  receiving information indicating disturbances of the optical beams;
  analyzing the received information to determine a touch type for the touch event, the analysis based on the location of the touch event and on propagation of a deformation wave along the touch-sensitive surface, the deformation wave caused by landing of the object on the touch-sensitive surface, wherein the deformation wave disturbs the optical beams and different touch types cause different deformation waves.

2. The method of claim 1 wherein the optical beams propagate from emitter to detector by total internal reflection, and optical beams are disturbed as a result of frustrated total internal reflection caused by touches on the touch-sensitive surface and caused by propagation of the deformation wave along the touch-sensitive surface.

3. The method of claim 1 wherein the analysis is analysis over time based on propagation of a deformation wave along the touch-sensitive surface.

4. The method of claim 1 wherein analyzing the received information comprises:

selecting received information for optical beams traversing the touch-sensitive surface after landing of the object and outside a contact area of the touch event; and analyzing the selected information to determine the touch type for the touch event.

5. The method of claim 1 wherein analyzing the received information comprises:

combining received information for multiple optical beams that are each disturbed by the deformation wave; and analyzing the combined information to determine the touch type for the touch event.

6. The method of claim 1 wherein the optical beams are organized into scans of the touch-sensitive surface, and analyzing the received information comprises:

selecting received information from two or more scans; and analyzing the selected information to determine the touch type for the touch event.

7. The method of claim 6 wherein the deformation wave propagates at a speed that is known a priori, and analyzing the received information comprises:

for each of the two or more scans, selecting received information for optical beams that traverse an expected vicinity of the deformation wave based on the speed of the deformation wave and the timing of the scan; and analyzing the selected information to determine the touch type for the touch event.

8. The method of claim 7 wherein analyzing the selected information comprises:

for each of the two or more scans, combining the selected information for multiple optical beams that are each disturbed by the deformation wave; and analyzing the combined information to determine the touch type for the touch event.

9. The method of claim 6 wherein the deformation wave propagates at a speed that is known a priori, and analyzing the received information comprises:

for each of the two or more scans, dividing the received information into zones according to a distance of optical beams from the location of the touch event; and analyzing the zones to determine the touch type for the touch event.

10. The method of claim 9 wherein analyzing the zones comprises:

for each of the zones, combining the received information for the optical beams in that zone; and analyzing the combined information to determine the touch type for the touch event.

11. The method of claim 1 wherein the analysis is capable of distinguishing between a touch event by a finger and a touch event by an instrument.

12. The method of claim 1 wherein the analysis is capable of distinguishing between touch events by different types of instruments.

13. The method of claim 1 wherein the analysis is capable of distinguishing between touch events by instruments with differently shaped contacting tips.

14. The method of claim 1 wherein the analysis is capable of distinguishing between landings with different peak contact force.

15. The method of claim 1 wherein the analysis is capable of distinguishing between landings with contact forces of different temporal widths.

16. The method of claim 1 wherein the analysis is based on an amplitude of the deformation wave.

17. The method of claim 1 wherein the analysis is based on a rate of attenuation of the deformation wave.

18. The method of claim 1 wherein the analysis is based on a frequency content of the deformation wave.

19. The method of claim 1 wherein the analysis is based on a width of the deformation wave.

20. The method of claim 1 wherein the analysis is based on a lateral shape of the deformation wave.

21. The method of claim 1 wherein the analysis is based on an originating location of the deformation wave.

22. The method of claim 1 wherein the analysis is based on reflection of the deformation wave from an edge of the touch-sensitive surface.

23. The method of claim 1 further comprising:

analyzing the received information to determine the location of the touch event.

* * * * *